(12) United States Patent
Khasnabish

(10) Patent No.: US 7,715,372 B2
(45) Date of Patent: *May 11, 2010

(54) METHOD AND SYSTEM FOR INSERTING SELECTED COMFORT SIGNAL

(75) Inventor: Bhumip Khasnabish, Lexington, MA (US)

(73) Assignee: Verizon Services Organization Inc., Irving, TX (US)

( * ) Notice: Subject to any disclaimer, the term of this patent is extended or adjusted under 35 U.S.C. 154(b) by 526 days.

This patent is subject to a terminal disclaimer.

(21) Appl. No.: 11/646,455

(22) Filed: Dec. 28, 2006

(65) Prior Publication Data

US 2008/0159161 A1 Jul. 3, 2008

(51) Int. Cl.
*H04L 12/66* (2006.01)

(52) U.S. Cl. .............. 370/352; 370/286; 370/290; 455/255

(58) Field of Classification Search ........... 370/351, 370/352; 704/227; 379/93.35, 92.23, 164, 379/215.01, 257; 381/61, 67
See application file for complete search history.

(56) References Cited

U.S. PATENT DOCUMENTS

| | | | |
|---|---|---|---|
| 6,404,863 B1* | 6/2002 | Beamish | 379/93.35 |
| 6,625,284 B1* | 9/2003 | Ariyama | 381/66 |
| 2003/0093270 A1* | 5/2003 | Domer | 704/227 |
| 2004/0125965 A1* | 7/2004 | Alberth et al. | 381/77 |
| 2006/0143001 A1* | 6/2006 | Arora | 704/205 |
| 2007/0036142 A1* | 2/2007 | Veschi et al. | 370/352 |
| 2007/0274284 A1* | 11/2007 | Dendukuri et al. | 370/351 |

OTHER PUBLICATIONS

Zopf, "Real-time Transport Protocol (RTP) Payload for Comfort Noise (CN)," Sep. 2002 (11 pages).

* cited by examiner

*Primary Examiner*—Curtis Kuntz
*Assistant Examiner*—Phung-Hoang J Nguyen

(57) ABSTRACT

During communication over the network, periods of silence may exist. During these periods, the system may enable a user at a user terminal to select a type of comfort signal to be played. The system may monitor transmission to detect periods of silence. The system may adapt the monitored transmission by adding the selected comfort signal during the periods of silence, as background noise, or during periods of silence and as background noise.

13 Claims, 4 Drawing Sheets

200

300

METHOD AND SYSTEM FOR INSERTING SELECTED COMFORT SIGNAL

BACKGROUND INFORMATION

A wide variety of means exist for communication between users. For example, a user may conduct phone calls via their home phone, work phone, and mobile phone. In addition, a user may also communicate via the Internet and other peer-to-peer models.

As technology improves, the performance of the communication network improves. Unfortunately, significant improvement in performance may cause user perception of system malfunctioning or a lack of functioning. For example, if the system is underutilized due to a long pause from a speaker, if there are impairments in the channels, or if there are recoverable or short duration faults in the network, communication between users may include long durations of intermittent silence during a conversation. During these periods of silence, the user may not be able to determine if the communication network is still functioning.

DETAILED DESCRIPTION

Reference will now be made in detail to exemplary embodiments, examples of which are illustrated in the accompanying drawings. The following description refers to the accompanying drawings in which the same numbers in different drawings represent similar elements unless otherwise represented. The implementations set forth in the following description of exemplary embodiments consistent with the present invention do not represent all implementations consistent with the claimed invention. Instead, they are merely examples of systems and methods consistent with aspects related to the invention as recited in the appended claims.

Methods and systems implementing exemplary embodiments described herein provide a comfort signal. A comfort signal is anything that is preferable to silence. Examples of a comfort signal can be noise, tone, music generation, etc. During communication over the network, periods of silence may exist. The system may enable a user at a user terminal to select a type of comfort signal to be played during periods of silence, as background noise, or during both periods of silence and as background noise. The system may monitor transmission to detect periods of silence. The system may adapt the monitored transmission by adding the selected comfort signal.

Figure 1:
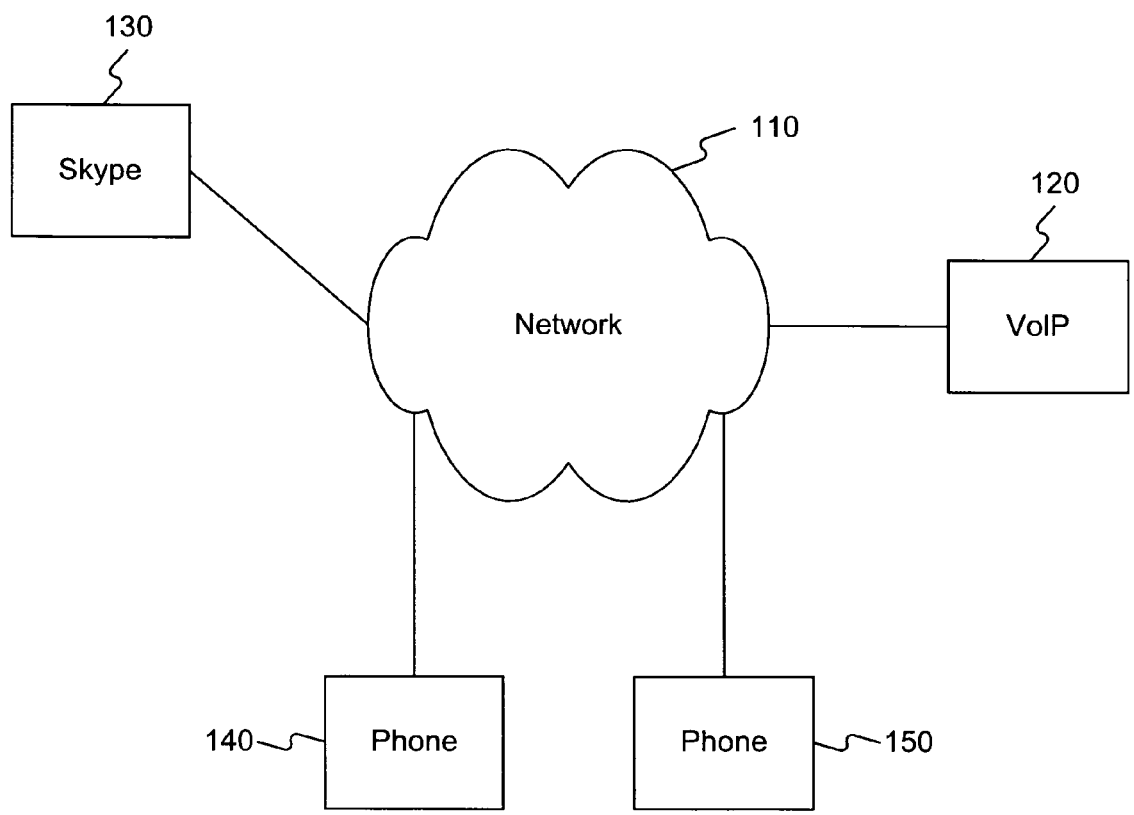
FIG. 1 illustrates a block diagram of an exemplary system environment for implementing exemplary embodiments.

FIG. 1 is a block diagram of a data processing and telecommunications environment, in accordance with methods and systems consistent with the principles of the present invention. The data processing and telecommunications environment 100 may include a network 110 and one or more user terminals 120, 130, 140, and 150. The one or more terminals may be implemented using voice-over Internet Protocol ("VoIP") technology 120 or a peer-to-peer model, such as Skype 130. The one or more terminals may also be implemented using a wireline phone 140 or a mobile phone 150 to interface with network 110. Although phones 140 and 150 are shown directly connected to network 110, any number of intervening elements, such as a Private Branch Exchange ("PBX"), may be interposed between phones 140 and 150.

Network 110 may be one or more communication networks that communicate information between user terminals 120, 130, 140, and 150. Network 110 may be any type of network for communicating information, including data, text, pictures, and video. Network 110 may be a shared, public, private, client-server, or peer-to-peer network encompassing a wide or local area including an extranet, an Intranet, the Internet, a local area network (LAN), wide area network (WAN), the public switched telephone network (PSTN), integrated services digital network (ISDN), radio links, wireless telephone and/or data network, and any other form of wired or wireless communication networks. Network 110 may be compatible with any type of communication protocol used by the components of the system environment to exchange information, such as Ethernet, ATM, SONET, Transmission Control/Internet Protocol (TCP/IP), Hypertext Transfer Protocol (HTTP), Wireless Application Protocol (WAP), the various wireless communication protocols (e.g., GSM, CDMA, EV-DO), or a peer-to-peer protocol. The network provider may be, for instance, an Internet Service Provider (ISP), a wired and/or wireless telephone service provider, a cable television provider, a satellite television provider, a WAN operator, a LAN operator, or an operator of a direct-link/person-to-person network. In addition, network 110 may be implemented using both PSTN and VoIP technology consistent with the principles of the present invention.

Figure 3:
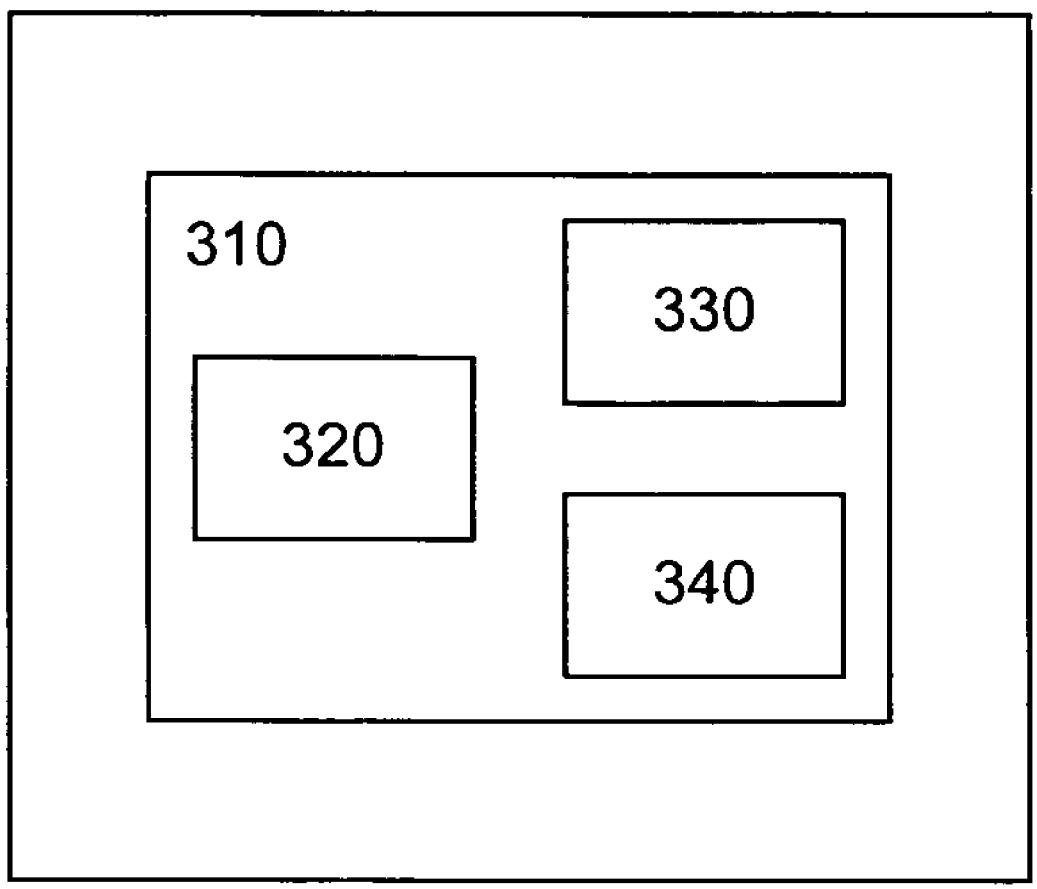
FIG. 3 illustrates a block diagram of an exemplary comfort center, consistent with an exemplary embodiment.

Telecommunications environment 100 may also include comfort center 300, depicted in FIG. 3. Comfort center 300 may provide a platform for managing the addition of a comfort signal over network 110. Comfort center 300 may be implemented using a combination of hardware, software, and/or firmware. For example, comfort center 300 may be implemented using a plurality of general purpose computers or servers coupled by a network (not shown). Comfort center 300 may be located, for example, on one or more of user terminals 120, 130, 140, and 150, and may also be located within the network 110.

User terminals 120, 130, 140, and 150 may be configured to communicate with comfort center 300. For example, a client application may be installed on user terminals 120, 130, 140, and 150, which directly communicates with comfort center 300. Also, user terminals 120, 130, 140, and 150 may communicate with comfort center 300 via a proxy. User terminals 120, 130, 140, and 150 may use aspects of TCP/IP including the hypertext transfer protocol ("HTTP"), the user datagram protocol ("UDP"), the file transfer protocol ("FTP"), the hypertext markup language ("HTML"), and the extensible markup language ("XML").

Figure 2:
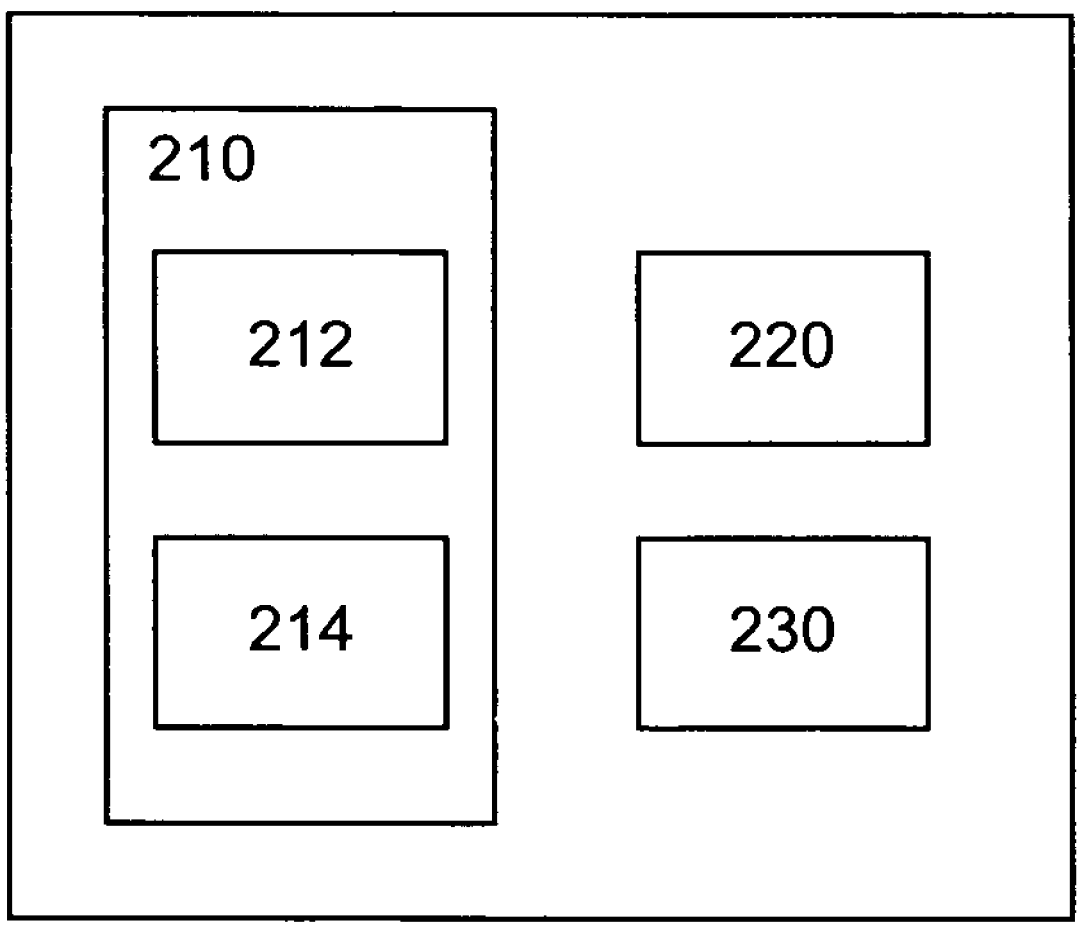
FIG. 2 illustrates a block diagram of an exemplary computerized system environment for a network terminal, consistent with an exemplary embodiment.

FIG. 2 is a block diagram exemplifying aspects of user terminals 120, 130, 140, and 150. The exemplary user terminal 200 illustrated in FIG. 2 may include controller 210, input device 220, and output device 230. Controller 210 may be one or more processing devices that execute computer instructions and data stored in one or more memory devices. Controller 210 may include, for example, central processing unit (CPU) 212 and memory unit 214.

Input device 220 provides the input to CPU 212. Input device 220 may include, for example, a keyboard, a microphone, and a mouse. Other types of input devices may also be implemented consistent with the principles of the present invention.

Output device 230 may include, for example, a display, a printer, and a speaker. Other types of output devices may also be implemented consistent with the principles of the present invention.

CPU 212 may be any controller such as an off-the-shelf microprocessor (e.g., INTEL PENTIUM) or an application-specific integrated circuit ("ASIC") specifically adapted for user terminal 200. Memory unit 214 may be one or more memory devices that store data and computer instructions that, when executed by CPU 212, cause the terminal 200 to perform the methods described herein. Memory unit 214 may be embodied with a variety of components of subsystems, including a random access memory ("RAM") and a read-only memory ("ROM").

If comfort center 300 is located within network 110, a network interface (not shown) provides a communications interface between user terminals 120, 130, 140, and 150 and comfort center 300. The network interface may receive and transmit communications from user terminals 120, 130, 140, and 150. For example, the network interface may be a modem, or a local area network ("LAN") port.

During communication, voice is transmitted as packets of bytes. These packets may be transmitted via RTP (IETF RFC 1889) streams. When no voice is present during a communication, there is a silence or packets without the sound of voices. This silence or packets without the sound may also occur, for example, if the system is underutilized or if there are impairments in the channels. If the user does not want these periods of silence transmitted, the user may select a type of comfort signal to be added in place of the silence.

Comfort center 300 may present the user with a list of comfort signal choices that the user terminal may select. Comfort center 300 may also receive a user input comfort signal from user terminals 120, 130, 140, and 150 via input device 220. The user may communicate with the comfort service to add white (i.e. Gaussian) noise or colored noise during these periods. This comfort signal may have frequencies within an audible range, which may be between approximately 330 Hz and 3.4 KHz, that may vary periodically in amplitude.

The comfort signal fills the bytes and packets of silence. The comfort signal may be generated using at least one byte of data. Each of the bytes of data contains eight bits, which may specify the type of comfort signal to be added (also referred to as the color of the noise). By using at least one byte, the user may be presented with many types of comfort signals. If the user has selected a type of comfort signal to be added, user terminals 120, 130, 140, and 150 and comfort center 300 may monitor the packet transmission at the endpoint and comfort center 300 may add the selected comfort signal to the transmission at the endpoint during, for example, periods of silence suppression.

The configuration or relationship of components illustrated in FIGS. 1 and 2 is exemplary. For example, input device 220 and output device 230 may be a plurality of independent devices within separate housings detachably connected to a generic controller, such as a personal computer or set-top box. In other implementations, controller 210, input device 220, and output device 230 may be integrated within a single housing such as a mobile telephone. One of ordinary skill in the art may select different configurations of components based on the requirements of a particular implementation of a user terminal giving consideration to factors including, but not limited to, cost, size, speed, form factor, capacity, portability, power consumption and reliability.

FIG. 3 is a block diagram exemplifying aspects of comfort center 300. Comfort center 300 may be located, for example, on one or more of user terminals 120, 130, 140, and 150, and may also be located within the network 110.

Comfort center 300 may include controller 310. Controller 310 may be one or more processing devices that execute computer instructions and data stored in one or more memory devices. Controller 310 may include, for example, CPU 320 and memory units 330 and 340. CPU 320 that may be any controller such as an off-the-shelf microprocessor (e.g., INTEL PENTIUM) or an application-specific integrated circuit ("ASIC") specifically adapted for comfort center 300.

Memory units 330 and 340 may be embodied with a variety of components of subsystems, including a random access memory ("RAM") and a read-only memory ("ROM"). Memory unit 330 may contain a database of comfort signal options that may be presented to the user terminals 120, 130, 140, and 150. User terminals 120, 130, 140, and 150 may select a type of comfort signal from the database. User terminals 120, 130, 140, and 150 may also input a desired comfort signal that is not part of the database of comfort signal options. If the user inputs a desired comfort signal that is not part of the database, memory unit 340 may store the user input comfort signal.

Once memory units 330 and 340 store the desired comfort signal from user terminals 120, 130, 140, and 150, CPU 320 may also monitor the packet transmission characteristics and insert the desired comfort signal during, for example, periods of silence. CPU 320 may insert the desired comfort signal as background noise, and may also insert the desired comfort signal during periods of silence and as background noise. In other implementations, memory units 330 and 340 may be integrated within a single memory unit. One of ordinary skill in the art may select different configurations of components based on the requirements of a particular implementation of a user terminal giving consideration to factors including, but not limited to, cost, size, speed, form factor, capacity, portability, power consumption and reliability.

Figure 4:
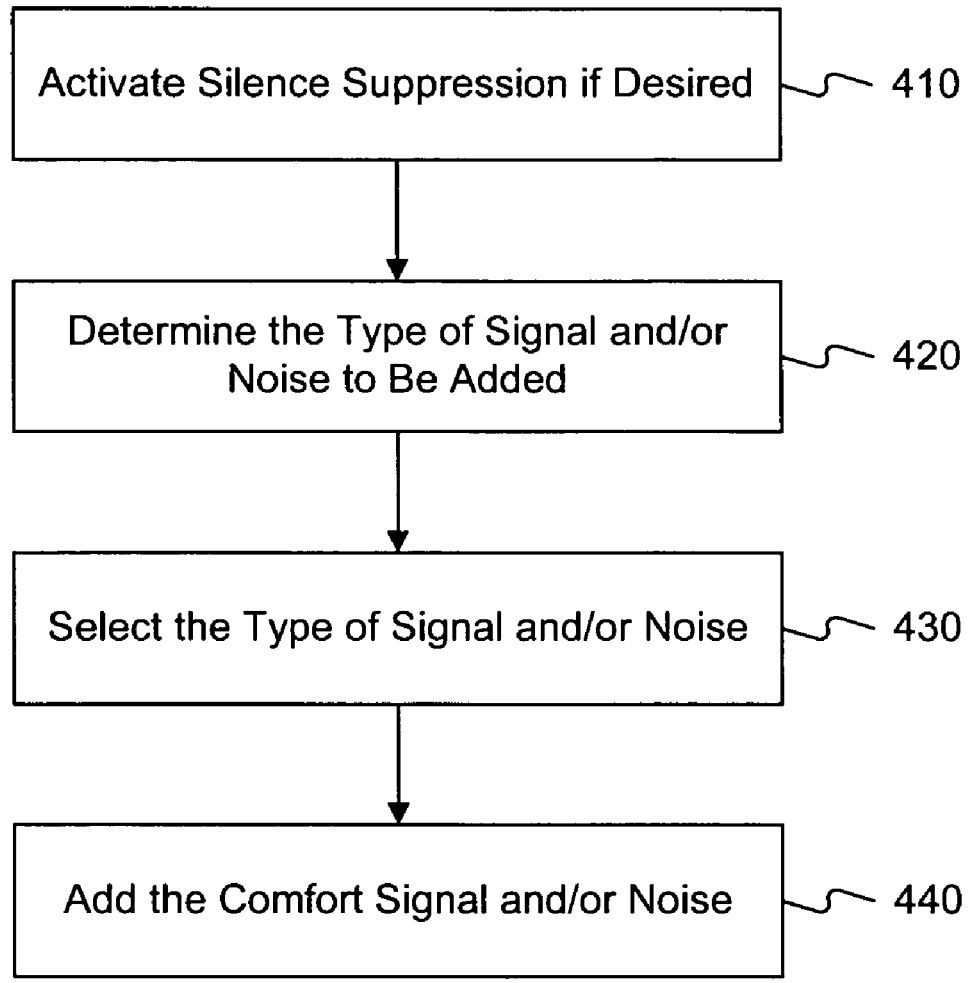
FIG. 4 illustrates an exemplary time flow of a video messaging process, consistent with an exemplary embodiment.

FIG. 4 contains a sequence diagram exemplifying the interaction of users with the exemplary systems and methods described herein. At step 410, a user may activate a silence suppression at the user terminal (i.e. terminals 120, 130, 140, and 150) to suppress information packets during, for example, periods of silence. If the user has decided to activate a silence suppression during communication, user terminals 120, 130, 140, and 150 may communicate with comfort center 300. Comfort center 300 may present the user with a list of comfort signal choices that the user terminal may select. Comfort center 300 may also receive a user input comfort signal from user terminals 120, 130, 140, and 150 via input device 220. The comfort signal may be white or colored noise and may have frequencies within an audible range, which may be between approximately 330 Hz and 3.4 KHz, that may vary periodically in amplitude.

At step 420, the user may determine the type of comfort signal to be added by communicating with the comfort service. Once the user has determined the type of comfort signal to be added, the user may select a comfort signal from the comfort center or input a desired comfort signal via input device 220 at step 430. At step 440, once the comfort signal has been selected, the comfort center may add the signal to the transmission at the endpoint during, for example, periods of silence suppression.

Other embodiments of the invention will be apparent to those skilled in the art from consideration of the specification and practice of the invention disclosed herein. For example, comfort signal generation may be used in any electromechanical apparatus to indicate that certain actions are occurring (i.e. opening a window or putting a vehicle in reverse). It is intended that the specification and examples be considered as exemplary only, with a true scope and spirit of the invention being indicated by the following claims.

What is claimed is:

1. A method comprising:
activating silence suppression for a transmission over a communications network;
receiving, from the user, a selection of a type of comfort signal to be added to the transmission, the type of comfort signal being one of noise, tone, or music, the comfort signal having a frequency between approximately 330 Hz and 3.4 KHz;
presenting, to the user, a user interface listing available sounds matching the selected type of comfort signal, the list of available sounds representing a database storing the sounds;
receiving, from the user via the user interface, a request for a comfort signal from either the list of available sounds, or a user-defined comfort signal;
determining whether the requested comfort signal is currently stored in the database, and storing the requested comfort signal in the database upon determining that the requested comfort signal is not stored in the database;
monitoring a packet transmission to detect periods of silence; and
adapting the monitored packet transmission by adding the requested comfort signal to the transmission during periods of silence, as background noise, or during periods of silence and as background noise.

2. The method of claim 1, wherein monitoring occurs at an endpoint of the transmission.

3. The method of claim 1, wherein the information packets are transmitted via RTP streams.

4. The method of claim 1, wherein the comfort signal is white noise.

5. The method of claim 1, wherein the comfort signal is colored noise.

6. The method of claim 5, wherein the color of the comfort signal is specified by at least one byte of information.

7. A system comprising:
a network providing telephony services;
a calling device, coupled to the network, configured to interface a user with the network; and
a comfort center coupled to either the calling device or the network,
wherein the comfort center and calling device enable the user to:
activate silence suppression for a transmission over a communications network,
receive, from the user, a selection of a type of comfort signal to be added to the transmission, the type of comfort signal being one of noise, tone, or music, the comfort signal having a frequency between approximately 330 Hz and 3.4 KHz,
present, to the user, a user interface listing available sounds matching the selected type of comfort signal, the list of available sounds representing a database storing the sounds,
receive, from the user via the user interface, a request for a comfort signal from either the list of available sounds, or a user-defined comfort signal,
determine whether the requested comfort signal is currently stored in the database, and storing the requested comfort signal in the database upon determining that the requested comfort signal is not stored in the database,
monitor a packet transmission to detect periods of silence, and
adapt the monitored packet transmission by adding the requested comfort signal during periods of silence, as background noise, or during periods of silence and as background noise.

8. The system of claim 7, wherein monitoring occurs at an endpoint of the transmission.

9. The system of claim 7, wherein the information packets are transmitted via RTP streams.

10. The system of claim 7, wherein the comfort signal is white noise.

11. The system of claim 7, wherein the comfort signal is colored noise.

12. The method of claim 11, wherein the color of the comfort signal is specified by at least one byte of information.

13. The system of claim 7, wherein the network is operable to perform Voice over Internet Protocol (VoIP).

* * * * *